(12) United States Patent
Hollermann et al.

(10) Patent No.: US 6,524,208 B1
(45) Date of Patent: Feb. 25, 2003

(54) MULTI-SPEED GEARBOX, IN PARTICULAR A SIX-SPEED GEARBOX

(75) Inventors: Erika Hollermann, Wallenhorst (DE); Hans Stoot, Hilter (DE)

(73) Assignee: Voith Turbo GmbH & Co. KG, Heidenhiem (DE)

(*) Notice: Subject to any disclaimer, the term of this patent is extended or adjusted under 35 U.S.C. 154(b) by 0 days.

(21) Appl. No.: 09/446,537
(22) PCT Filed: Jun. 24, 1998
(86) PCT No.: PCT/EP98/03847
§ 371 (c)(1), (2), (4) Date: Mar. 26, 2001
(87) PCT Pub. No.: WO99/00611
PCT Pub. Date: Jan. 1, 1999

(30) Foreign Application Priority Data

Jun. 26, 1997 (DE) .......................................... 197 27 153

(51) Int. Cl.[7] .............................................. F16H 47/08
(52) U.S. Cl. ......................................................... 475/91
(58) Field of Search ..................................... 475/91, 92

(56) References Cited

U.S. PATENT DOCUMENTS

| | | | |
|---|---|---|---|
| 3,979,973 A | | 9/1976 | Klaue |
| 4,046,031 A | | 9/1977 | Ott et al. |
| 4,070,927 A | | 1/1978 | Polak |
| 4,747,464 A | * | 5/1988 | Lanzer .......................... 180/248 |
| 4,858,493 A | * | 8/1989 | Cordner | |
| 5,030,180 A | * | 7/1991 | Johnston ....................... 475/91 |
| 5,472,382 A | * | 12/1995 | Aramendia .................. 475/107 |
| 5,766,108 A | * | 6/1998 | Johnston ....................... 475/91 |

FOREIGN PATENT DOCUMENTS

| | | |
|---|---|---|
| DE | 29 35 361 | 3/1981 |
| DE | 33 31 039 | 3/1985 |
| DE | 195 14 276 | 10/1996 |
| EP | 0 073 102 | 7/1982 |
| EP | 0 342 672 | 5/1989 |
| FR | 2 483 553 | 5/1981 |
| GB | 1 459 886 | 11/1974 |

* cited by examiner

*Primary Examiner*—Dirk Wright
(74) *Attorney, Agent, or Firm*—Randall J. Knuth

(57) ABSTRACT

The invention is relative to a multi-speed gearbox comprising a gearbox input shaft and a gearbox output shaft, a first mechanical gearbox portion, means for coupling this first mechanical part to the gearbox input shaft, and a starting element. The invention further comprises a second mechanical gearbox portion comprising at least one planetary gear set. A first gearbox element of the second mechanical gearbox portion is coupled to the first mechanical gearbox portion and the second gearbox outlet shaft. The starting element is designed as a brake device and associated with a second gearbox element of the second mechanical gearbox portion. The first mechanical gearbox portion has means for carrying out the individual gear steps, which can be controlled in such a manner that the transmissions in first gear and in reverse gear can be determined by the second mechanical gearbox portion.

18 Claims, 4 Drawing Sheets

Fig.2

|   | K1 | K2 | B1 | B2 | B3 | B4 |
|---|----|----|----|----|----|----|
| 1 | X  |    |    |    |    | X  |
| 2 | X  |    |    |    | X  |    |
| 3 | X  |    |    | X  |    |    |
| 4 | X  |    | X  |    |    |    |
| 5 | X  | X  |    |    |    |    |
| 6 |    | X  | X  |    |    |    |
| R |    |    | X  |    |    | X  |
| H |    |    |    |    | X  | X  |

MULTI-SPEED GEARBOX, IN PARTICULAR A SIX-SPEED GEARBOX

BACKGROUND OF THE INVENTION

1. Field of the Invention

The present invention relates to a multi-speed gearbox, and in particular, a six-speed gearbox for use with automatic transmissions.

2. Description of the Related Art

Multi-speed gearboxes in the form of automatic transmissions are known in a plurality of designs based primarily on a mechanical gearbox portion associated with an appropriate starting element. In particular, hydraulic torque converters or hydraulic couplings are used as starting elements in vehicle construction. The operating range of the hydraulic components is limited thereby primarily to the starting range. Gearbox designs are also possible with division of power in which, during the transmission of power the hydraulic component is used in the lower gears.

Automatic transmissions with starting elements in the form of hydraulic speed/torque converters are known, e.g., from Voith: "Hydrodynamics in Drive Technology", Engineer Digest, Vereinigte Fachverlage Krausskopf-Verlag. Hydraulic torque converters can be divided into so-called converter gearboxes and differential converter gearboxes.

Converter gearboxes include all gearboxes in which a converter is connected to additional mechanical elements in order to bring about a change or expansion of the operating range of the gearbox. The converter can remain filled thereby during operation of the mechanical gear steps or can also be bridged filled or emptied. If the converter is placed into an outer power branch, it then no longer participates in the transmission of power in the mechanical gear steps and can remain filled.

Differential converter gearboxes are gearboxes with power branching in which the power flow is divided into a hydraulic branch and into a mechanical branch. A distinction can be made thereby between inner and outer power branching. A planetary gear set, as a rule a differential, can be combined, e.g., with a torque converter in such a manner that one element is connected to the pump impeller of the converter, the second element of the planetary gear set is connected to the drive shaft and the third element to the driven shaft. As the output speed increases, the hydraulically transmitted power component is reduced on account of the action of the differential whereas the mechanically transmitted component increases. This results in a higher degree of total efficiency for the gearbox than is the case for a purely hydraulic transmission of energy. Finally, the hydraulic converter is automatically bridged approximately at the operating point of its best efficiency and the power is transmitted purely mechanically.

A disadvantage of converter gearboxes is essentially the fact that the range which can be used for driving and which represents a certain translation ratio can only be achieved with relatively large converter units, which require a significant amount of space and are very expensive. All previously known solutions for planetary coupling gearboxes for bus gearboxes are characterized by translations which require a torque converter as an additional gear. These gearboxes can not be readily used because the first gear is always constituted by an individual planetary gear set for which the translation can not be increased further. A further disadvantage is the fact that the hydraulic converter is not self-regulating. It must therefore be adapted to each drive machine by changing the pump impeller and/or turbine and the differential.

SUMMARY OF THE INVENTION

The invention therefore has the basic problem of developing a gearbox unit of the initially cited type further in such a manner that the disadvantages cited are avoided. Specifically, a solution which is simple in design and can be realized with low expense for control technology is to be developed which makes it possible to realize a simple adaptation to various requirements, especially to drive engines, without significant additional expense.

According to the invention, in order to realize a multi-speed gearbox the hydraulic converter is eliminated, such that the translation achievable with the converter is realized in a more cost-advantageous manner and with less complexity regarding the required construction space of an additional gear. This means that the mechanical gearbox portion is expanded by an additional gear. Another planetary gear set is preferably used to this end. The starting then takes place with a braking device for one of the gearbox elements of the planetary gear sets, preferably the ring gear, in which instance the braking device must be dimensioned as an inch brake. The dynamic viscosity of the oil forms the basis for this. The solution in accordance with the invention has the advantage of simpler control, since no centrifugal forces have to be compensated. Moreover, the braking device always cooperates during starting with the lowest engine speed, which speed can not be achieved with a converter. This results in a reduction of the fuel consumption.

There is a plurality of possibilities for the design of the gearbox. However, there is always a mechanical gearbox portion, which consists of a plurality of spur gear sets or planetary gear sets, as well as another mechanical gearbox set which is associated with an inch device, either in the form of an inch brake or an inch coupling.

The use of a so-called inch brake or also inch coupling offers yet another advantage over a hydraulic converter, namely, the possibility of remote control. An inch brake is preferably constructed with laminar design. The torque of an inch brake is controlled with the modulated oil pressure for the lamination pressure. As a result, the gearbox can be adapted to different engines and vehicle masses over a wide range exclusively by software.

The construction space is reduced in its axial length by using the inch device since large hydraulic converters can be eliminated. The mounting length could therefore be shortened for the entire gearbox or the gearbox could also be designed as a housing variant. The control for the shifting devices and the inch device can be placed above in mounting position. This means a simpler and more economical design than the previously known design for hydraulic converters with oil sump.

An inch device, preferably in the form of a multiple disk brake device, is used in the gearbox which device is also a shifting brake for the first gear and the reverse gear at the same time. The outer laminations are surrounded by an annular chamber. The latter is filled with oil during starting so that the laminations run fully in the oil. The oil exits at the inner diameter and flows from there into the oil sump. The oil inflow into the annular chamber is controlled with a magnet valve in the central control block of the gearbox. In the case of flooded laminations the torque is transmitted only by the shearing force of the oil. The laminations do not touch each other thereby. This can be calculated with the formula for the dynamic viscosity of the oil:

$$Vis = (N \times s/m^2)$$

or also, unshortened, $$Vis = N \times m/(m/s \cdot m^2)$$

in which

Vis=The viscosity of the oil at the instantaneous temperature

N (Newton)=The circumferential force on the laminations m (m)=The oil slot between the laminations m/s (m/s)=The average circumferential speed of the laminations $m^2$ ($m^2$)=The entire lining surface moistened in the oil slot.

The product of N×Rm (Nm) is then the torque transmitted by the brake. Rm indicates the average lamination radius.

During starting the greatest circumferential speed is present right at the beginning. This speed becomes smaller and smaller as the travel speed increases, so that the slot for constant torque must also become smaller and smaller until the lining contacts the counterlamination. Then, the outer oil is cut off and the laminations function just as in the other multiple disk brakes in the gearbox. The described property of the oil is also used in converter-inch couplings, in large control couplings, in wheel brakes in large construction machines, in VISCO couplings as differential lock in all-wheel vehicles, in oscillation dampers, etc.

The inch device can also be designed, e.g., as described in German Patent No. DE 195 14 276 A1. The disclosure of this publication, especially regarding the construction and method of operation of the device described in it, is included herewith to its full extent into the disclosed content of this application.

In particular, the multi-speed gearbox comprises at least one gearbox input shaft and one gearbox output shaft, a first mechanical gearbox portion, means for coupling the first mechanical gearbox portion to the gearbox input shaft and a starting element. According to the invention, another second mechanical gearbox portion is provided. This latter comprises at least one planetary gear set. A first gearbox element of the second mechanical gearbox portion is coupled to the first mechanical gearbox portion and to the gearbox output shaft. The starting element is designed as a braking device and associated with a further, second gearbox element of the second mechanical gearbox portion. Means for realizing the individual gear sets are associated with the first mechanical gearbox portion which can be actuated in such a manner that the translations can be determined in the first gear and in the reverse gear by the second mechanical gearbox portion.

The planetary gear set of the second mechanical gearbox portion comprises at least the following gearbox elements: A sun gear, a ring gear, a crosspiece and planetary gears. The first gearbox element is preferably formed by the sun gear and the second gearbox element by the crosspiece. A third gearbox element of the second mechanical gearbox portion is connected in a fixed-rotatable manner to a first gearbox partial element of the first mechanical gearbox portion.

The starting element is preferably designed as an inch brake. However, there is also the possibility of designing it as an inch coupling. It is preferable to use starting elements with a laminar design.

The means for realizing the gear steps are designed in the form of coupling devices and/or braking devices, preferably with a laminar design.

A plurality of possibilities are available for the design of the first mechanical gearbox portion. In principle, any variant is conceivable which makes available the possibility of a series coupling of the second mechanical gearbox portion for the starting gear and reverse gear. For example, a variant with three planetary gear sets is conceivable—a first planetary gear set, a second planetary gear set and a third planetary gear set. Each planetary gear set comprises as gearbox elements at least one sun gear, one ring gear, a crosspiece and planetary gears. A first gearbox element of the first planetary gear set is connected in a fixed-rotatable manner to the gearbox input shaft. A second gearbox element of the third planetary gear set is connected in a fixed-rotatable manner to the gearbox output shaft. The first gearbox element of the first planetary gear set of the first mechanical gearbox portion is formed by the sun gear. The second gearbox element of the third planetary gear set of the first mechanical gearbox portion is preferably formed by the crosspiece.

The third gearbox element of the second mechanical gearbox portion is connected in a fixed-rotatable manner to the third gearbox element, designed as first gearbox partial element, of the third planetary gear set of the first mechanical gearbox portion. The third gearbox element of the third planetary gear set of the first mechanical gearbox portion is formed thereby by its ring gear. The third gearbox element of the second mechanical gearbox portion is preferably also formed by its ring gear.

The means for realizing the individual gear steps comprise at least two coupling elements—a first coupling element and a second coupling element as well as at least three brake devices—a first brake device, a second brake device and a third brake device. The first gearbox elements of the second and of the third planetary gear set can be coupled at least indirectly to the gearbox input shaft by the first coupling element. A further, second gearbox element of the second planetary gear set and a third gearbox element of the third planetary gear set can be coupled to the gearbox input shaft by the second coupling element. A brake device is associated with a further, third gearbox element of the first, the second and the third planetary gear set of the first mechanical gearbox portion. The first gearbox elements of the second and of the third planetary gear set of the first mechanical gearbox portion are preferably formed by the sun gear. The second gearbox element of the second planetary gear set of the first mechanical gearbox portion is formed by the crosspiece, and the third gearbox elements of the individual planetary gear sets of the first mechanical gearbox portion are formed by the ring gears.

The gearbox arrangement of the invention can be combined with further elements, e.g., with at least one power take-off for driving other vehicle components, e.g., a ventilator [cooling fan] or right-angle gear drives. Furthermore, the use of a hydraulic retarder in the entire gearbox is also conceivable.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 illustrates the shifting connection diagram for a design in accordance with FIG. 1;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
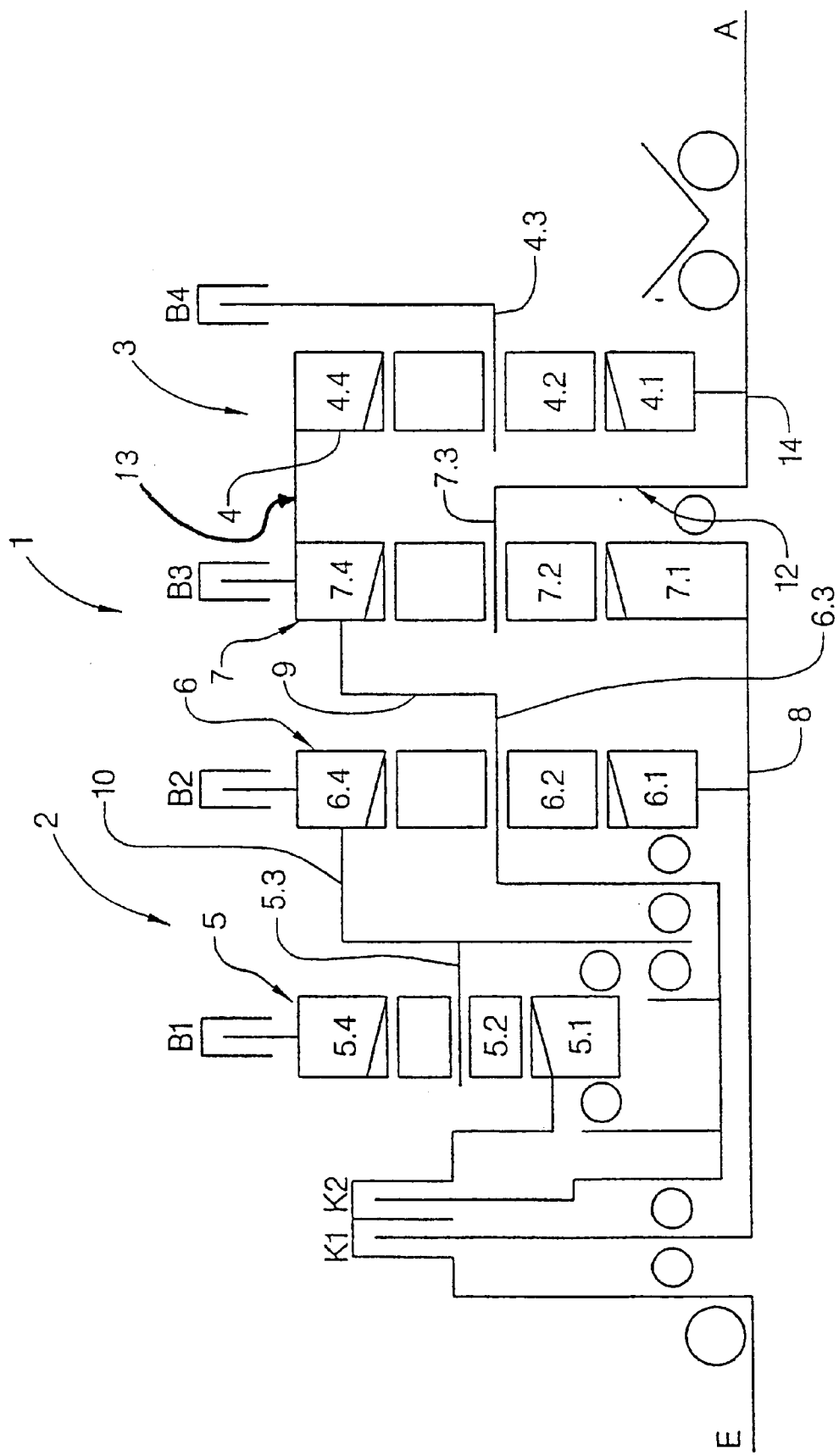
FIG. 1 is a schematic view of one embodiment of the invention.

FIG. 1 schematically illustrates the design and the method of operation of a multi-speed gearbox 1, especially of a six-speed gearbox, using a simplified view. This gearbox comprises a first mechanical gearbox portion 2 for the representation of five gears and comprises a second mechanical gearbox portion 3, here in the form of a planetary gear set 4, located downstream from this first mechanical gearbox, observed in the direction of power flow in traction operation. Furthermore, the gearbox comprises gearbox input shaft E and gearbox output shaft A. The first mechanical gearbox portion 2 comprises three planetary gear sets, a first planetary gear set 5, a second planetary gear set 6 and a third planetary gear set 7. Planetary gear sets 5, 6 and 7 each comprise at least one sun gear, planetary gears, a ring gear and a crosspiece. These individual planetary gear set components are numbered as follows for the individual planetary gear sets 5 to 7:

Sun gears 5.1, 6.1 and 7.1
Planetary gears 5.2, 6.2 and 7.2
Crosspiece 5.3, 6.3 and 7.3 and
Ring gear 5.4, 6.4 and 7.4.

A permanent mechanical coupling is present between gearbox input shaft E and a first gearbox portion of first planetary gear set 5, which is formed by sun gear 5.1. A first gearbox element of planetary gear sets 5, 6 and 7 can be coupled via shifting element K to gearbox input shaft E. In the present instance the gearbox input shaft can be coupled via a first coupling element K1 to a first gearbox element of the second planetary gear set 6 and of the third planetary gear set 7. The first gearbox elements are formed thereby by sun gears 6.1 of planetary gear set 6 and of planetary gear set 7. A second coupling element K2 makes possible a further, second coupling possibility of gearbox input shaft E to a second gearbox element of the second planetary gear set 6. This second gearbox element is formed by crosspiece 6.3 of the second planetary gear set 6.

The individual planetary gear sets 5, 6 and 7 of the first mechanical gearbox portion 2 are coupled to each other. Crosspiece 5.3 of the first planetary gear set 5 is connected in a fixed-rotatable manner to ring gear 6.4 of the second planetary gear set 6. There is a further, fixed-rotatable connection between crosspiece 6.3 of the second planetary gear set 6 and ring gear 7.4 of the third planetary gear set 7 as well as between sun gears 6.1 of the second planetary gear set 6 and 7.1 of the third planetary gear set 7. This coupling is realized by appropriate connection elements, preferably in the form of connection shafts. Sun gears 6.1, 7.1 of second planetary gear set 6 and of third planetary gear set 7 are arranged thereby on a first transmission shaft 8. The coupling between crosspiece 6.3 and ring gear 7.4 of second and third planetary gear set 6 and 7 takes place via connection 9. There is a further mechanical coupling between crosspiece 5.3 of first planetary gear set 5 and ring gear 6.4 of second planetary gear set 6. This coupling is released via connection element 10.

Gearbox input shaft E is continuously coupled in the instance shown to a first gearbox element of first planetary gear set 5. This first gearbox element is formed by sun gear 5.1 of first planetary gear set 5.

Moreover, the gearbox input shaft can be coupled via first coupling element K1 to a first gearbox portion of the second planetary gear set 6 and of third planetary gear set 7. The coupling of gearbox input shaft E to a second gearbox portion of second planetary gear set 6 takes place via a further, second coupling element K2. The second gearbox element of second planetary gear set 6 is formed by crosspiece 6.3. Moreover, at least one brake element is associated with the individual planetary gear sets 5, 6 and 7, which brake element is designated here for first planetary gear set 5 by B1, for second planetary gear set 6 by B2 and for third planetary gear set 7 by B3. The individual brake elements B1, B2 and B3 are associated with ring gears 5.4, 6.4 and 7.4.

The first mechanical gearbox portion 2 is connected to gearbox output shaft A. This connection takes place via crosspiece 7.3 of third planetary gear set 7.

The second mechanical gearbox portion 3, downstream from the first mechanical gearbox 2 and comprising planetary gear set 4, is also coupled to gearbox output shaft A. This coupling takes place via sun gear 4.1 of planetary gear set 4. A further, third brake element B4, especially crosspiece 4.3, is associated with planetary gear set 4. A mechanical connection between the first mechanical gearbox portion 2 and the second mechanical gearbox portion 3 takes place via two couplings 12, 13. The first coupling 12 is realized between crosspiece 7.3 of the third planetary gear set and sun gear 4.1 of planetary gear set 4, which makes possible at the same time the coupling of the first mechanical gearbox portion 2 to gearbox output shaft A. To this end these elements, crosspiece 7.3 and sun gear 4.1, are arranged on a common transmission shaft 14. There is a further mechanical coupling 13 between ring gears 4.4 of planetary gear set 4 and 7.4 of the third planetary gear set 7 of the second mechanical gearbox portion 2. Said coupling preferably takes place directly. Connection shaft 14 forms output shaft A of gearbox 1.

The individual shifting elements, that is, the coupling elements and brake elements K1, K2 and B1, B2, B3 and B4 are preferably designed with a laminar construction. Other transmission devices are also conceivable.

The individual gear steps can be realized by response, that is, activation or deactivation of the individual shifting elements associated with first mechanical gearbox portion 2. A further gear preceding the other gear steps is realized by additional, second mechanical gearbox portion 3. Moreover, the transmission of power in reverse gear also takes place via this gear. The actuation of the individual shifting elements, that is, the starting or releasing of the individual shifting elements is illustrated by a shifting diagram in FIG. 2.

The starting process is realized thereby by actuating brake element B4 associated with second mechanical gearbox portion 3. This brake element B4 is also designated as a so-called starting brake. Crosspiece 4.3 of planetary gear set 4 is braked thereby. Brake element B4 is dimensioned as a so-called inch brake. The basis for it is formed by the dynamic viscosity of the oil Vis=N×s/m² or, unshortened, Vis=N×m/(m²×m:s). The inch brake can be controlled relatively easily since no centrifugal forces have to be compensated. The outside laminations of brake element B4 are surrounded by an annular chamber (not shown here). This chamber is filled during the starting process with oil so that the laminations run fully in the oil. The oil then exits at the inner diameter and flows from there into the oil sump. The oil flow into the annular chamber is controlled, e.g., by a magnet valve in the central control block of the gearbox. In the case of flooded laminations the torque M is transmitted only by the shearing force of the oil. The laminations do not touch each other thereby.

The individual variables in the cited equations have the following significance:

Vis=The viscosity for the oil at the instantaneous temperature

N (Newton)=The circumferential force on the laminations m (m)=The oil slot between the laminations m/s (m/s)=The average circumferential speed of the laminations $m^2$ ($m^2$)=The entire lining surface moistened in the oil a slot.

The torque transmitted by braking device B4 is then formed as follows: $M_{B4}$=N×Rm.

During starting the greatest circumferential speed is present right at the beginning. This speed becomes smaller and smaller as the travel speed increases, so that the slot for constant torque M must also become smaller and smaller until the lining contacts the counterlamination. Then, the outer oil is cut off and the laminations function just as in the other multiple disk brakes B1, B2 and B3 in the gearbox.

This starting process is sketched into the shifting diagram as the first gear. In this instance the first coupling element K1 and the fourth brake element B4 are actuated. This brings it about that gearbox input shaft E is in a driving connection via the first coupling element K1 with sun gear 6.1 of second planetary gear set 6 and with sun gear 7.3 of third planetary gear set 7. In addition, gearbox input shaft E is in constant driving connection with sun gear 5.1 of the first planetary gear set. An optimal starting process is made possible by the inch function realized by fourth brake element B4. This starting gear is entered in the shifting diagram as the first gear.

In the second gear the first coupling element K1 remains actuated, the fourth brake element B4 is released and the third brake element B3 actuated. The transmission of power takes place thereby from the gearbox input shaft via first coupling element K1, transmission shaft 8 onto sun gear 6.1 of the second planetary gear set 6 as well as onto 7.1 of the third planetary gear set 7. Ring gear 7.4 of the third planetary gear set is firmly braked to a standstill by actuation of the third brake element B3 and the torque is transmitted via crosspiece 7.3 to gearbox output shaft A.

In the following third gear the third brake element B3 is released during the transition and the second brake element B2 actuated while the first coupling element K1 remains engaged. The transmission of power in traction operation takes place thereby likewise via gearbox input shaft E, the first coupling element K1, transmission shaft 8 onto sun gear 6.1 of the second planetary gear set 6 and onto sun gear 7.1 of the third planetary gear set 7. As a result of the firm braking of ring gear 6.4 of the second planetary gear set 6, crosspiece 6.3 of the second planetary gear set 6 is driven and ring gear 7.4 of the third planetary gear set 7 is also driven via coupling 9. This results in a differential speed between sun gear 7.1 of the third planetary gear set 7 and ring gear 7.4 of the third planetary gear set 7 which brings it about that the planetary gears meshing with the latter are also put in rotation, during which crosspiece 7.3 is driven. Gearbox input shaft E is then coupled to gearbox output shaft A.

A transmission of power takes place in gears 1 to 3 even onto sun gear 5.1 of the first planetary gear set 5. A small part of the power transmitted via gearbox input shaft E is consumed at the first planetary gear set 5 via the back coupling of the individual planetary gear sets 4, 5, 6 and 7 among each other.

In the following fourth gear the second brake element B2 is released and the first brake element B1 actuated. The transmission of power then takes place in traction operation from gearbox input shaft E via the second coupling element K1 onto sun gears 6.1 and 7.1 of the second planetary gear set 6 and of the third planetary gear set 7 as well as via the constant, fixed-rotating connection of gearbox input shaft E to sun gear 5.1 of the first planetary gear set 5. Since ring gear 5.4 is firmly braked via first brake element B1, crosspiece 5.3 is driven and, via coupling 10 with the second planetary gear set 6, ring gear 6.4 of the second planetary gear set 6, during which crosspiece 6.3 is driven due to the relative speed between both, that is, between sun gear 6.1 and ring gear 6.4. The power is then transmitted further onto gearbox output shaft A via crosspiece 6.3, which is coupled via coupling 9 to ring gear 7.4 of the third planetary gear set 7, during which ring gear 7.4 is also caused to rotate, whereupon crosspiece 7.3 of the third planetary gear set 7, which can be coupled at least indirectly to gearbox output shaft A, is driven due to the relative speeds between sun gear 7.1 and ring gear 7.4 of the third planetary gear set 7.

In the following, fifth gear only the two coupling elements K1, K2 are actuated. All brake elements B1 to B4 are released. In this instance the transmission of power in traction operation takes place via several power paths to gearbox output shaft A. The gearbox input shaft is coupled via actuated coupling element K2 to crosspiece 6.3 and therewith to ring gear 7.4 of third planetary gear set 7. At the same time gearbox input shaft E is additionally coupled via coupling element K1 to sun gear 7.1 of planetary gear set 7. Sun gear 5.1 of first planetary gear set 5 is also in a driving connection with gearbox input shaft E. Due to the differential speeds between sun gear 7.1 and ring gear 7.4 of the third planetary gear set, crosspiece 7.3 and therewith gearbox output shaft is then driven.

In the following, sixth gear the first coupling element K1 is released and, in addition, brake element B1 actuated. This has the consequence that the transmission of power takes place essentially via the first and the second planetary gear set 5 and 6. A division of power also takes place in this instance. A part of the power fed in via the gearbox input shaft is transmitted thereby via actuated, second coupling element K2. The crosspiece of the second planetary gear set 6 as well as ring gear 7.4 of the third planetary gear set 7 are driven thereby via coupling element K2. Moreover, as a result of the continuing connection between sun gear 5.1 of the first planetary gear set 5, a driving of the latter takes place. As a result of the braking, that is, the standstill of ring gear 5.4 of first planetary gear set 5 torque is also transmitted here onto crosspiece 5.3 of the first planetary gear set, during which the latter is coupled to ring gear 6.4 of the second planetary gear set. Since crosspiece 6.3 of second planetary gear set 6 and ring gear 7.4 of third planetary gear set 7 are also driven via actuated coupling element K2, the speed of sun gear 6.1 results from the relative speed. Sun gear 7.1 of third planetary gear set 7 is also driven thereby via transmission shaft 8 and makes possible therewith the drive of crosspiece 7.3 and therewith of gearbox output shaft A in conjunction with the rotation of ring gear 7.4 of the third planetary gear set.

For the reverse gear only the first brake element B1 and fourth brake element B4 are actuated. This effects a reversal of direction of rotation of gearbox output shaft A in relation to the traction operation.

In the individual gears only the power onto the individual planetary gear sets 5, 6, 7 and also 4 is divided. At the third planetary gear set 7 these power components are then brought back together again and transferred via crosspiece 7.3 of the third planetary gear set onto gearbox output shaft A.

The gearbox variant described in FIGS. 1 and 2 is only a basic variant of many. The decisive factor is the fact that the inch brake, e.g., in the form of a multiple disk brake, is used for realizing the starting process. The gearbox described here is characterized in that it comprises six forward gears, a reverse gear, only two coupling devices and four braking devices as well as an inch brake for starting.

The gearbox arrangement described can be combined with different elements depending on the additional tasks to be solved, e.g., the drive of other units, the realization of the braking function or the realization of the transfer of power onto the axle of a vehicle. Possible basic variants thereby are solely a combination of the described gearbox with a retarder. There is also the possibility of providing a power take-off on the right and/or a power take-off on the left and/or several power take-offs. A gearbox design with retarder free of a power take-off is also conceivable.

In order to transmit the driving power from the gearbox output shaft onto the vehicle axle a right-angle drive with appropriate dimensioning and design in accordance with the mounting position of the gearbox can be provided.

Figure 3A:
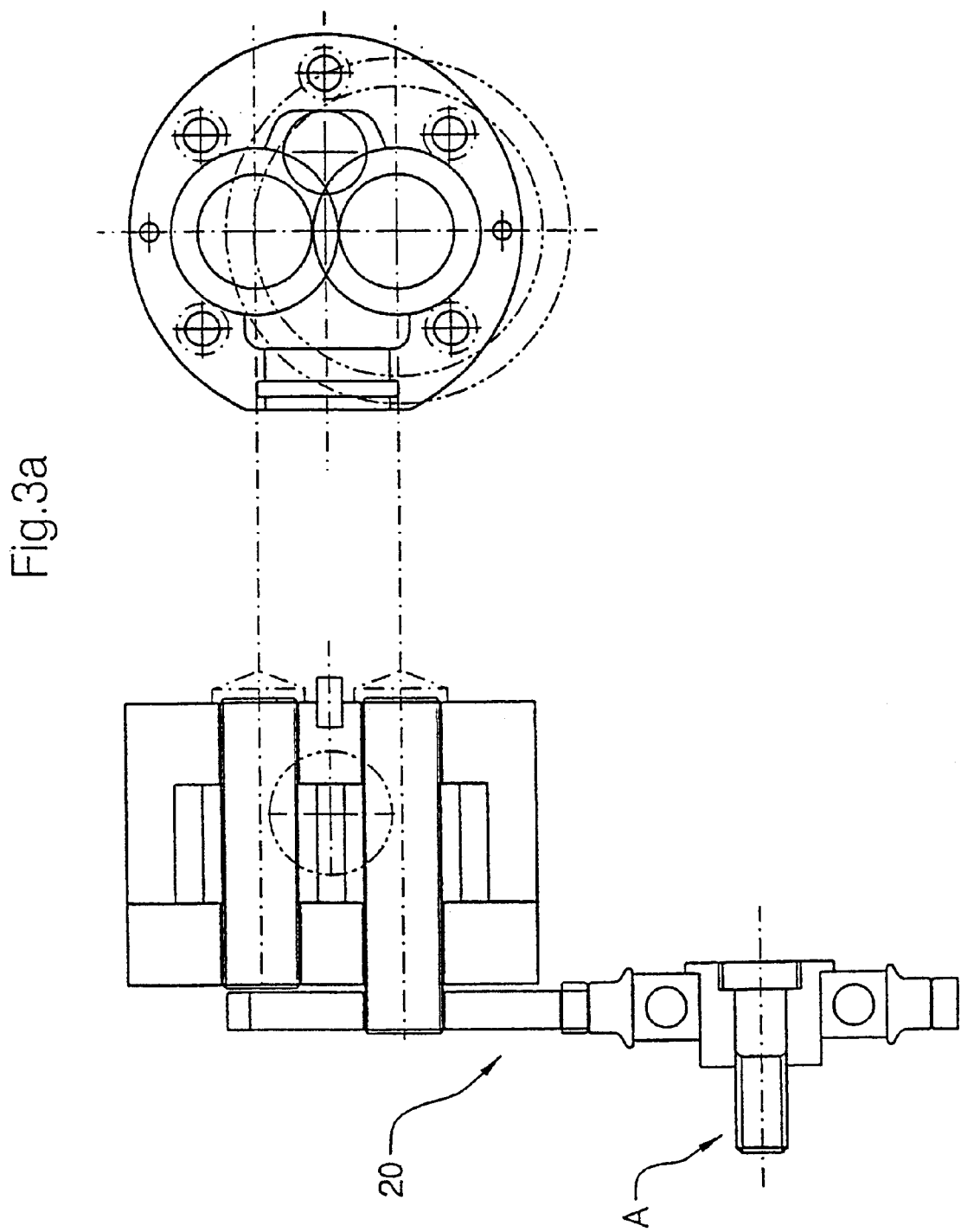
FIG. 3a illustrates the drive for the gearbox oil pump.

The variant described in FIGS. 1, 2 can also be designed without retarder or right-angle drive or without retarder with one or more right-angles drives, with a right-angle drive on the left or a right-angle drive on the right. The designs of a right-angle drive are shown in FIG. 3*a*. The right-angle drive is designated in it with 20 and serves for driving the oil pump.

Figure 3B:
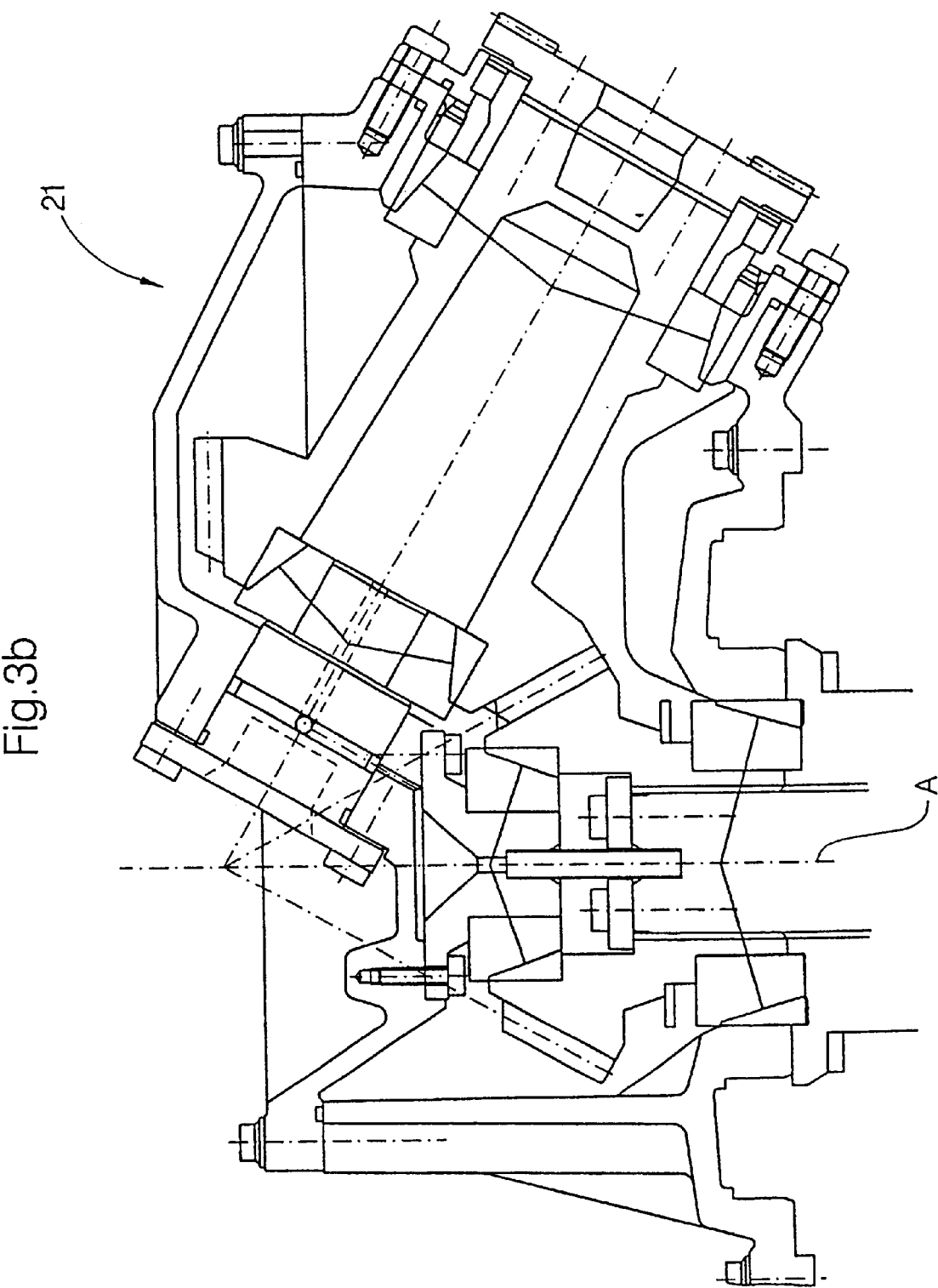
FIG. 3b illustrates a combination of the gearbox with downstream right-angle gear drive for transmitting the drive power onto the axle.

FIG. 3*b* illustrates the providing of a right-angle drive 21 coupled to gearbox output shaft A.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A multi-speed gearbox comprising:
   a gearbox input shaft and a gearbox output shaft;
   a first mechanical gearbox portion;
   means for coupling said first mechanical gearbox portion to said gearbox input shaft;
   a start element including a second mechanical gearbox having at least one planetary gear set wherein a first gearbox element of said second mechanical gearbox is coupled to said first mechanical gearbox and to said gearbox output shaft, and said start element is associated with a second gearbox element of said second mechanical gearbox, said start element being capable of being selectively used for both a first gear and a reverse gear; and
   means for realizing individual gear steps that are associated with the first mechanical gearbox portion, said means being actuated in such a manner that transmissions into the first gear and the reverse gear can be determined by said second mechanical gearbox portion.

2. The multi-speed gearbox according to claim 1, wherein:
   said at least one planetary gear set of said second mechanical gearbox portion comprises:
   a sun gear;
   a ring gear;
   a crosspiece;
   at least one planetary gear;
   said first gearbox element is formed by said sun gear; and
   said second gearbox element is formed by said crosspiece.

3. The multi-speed gearbox according to claim 1, further comprising a third gearbox element of said second mechanical gearbox portion, said third gearbox element being connected in a fixed-rotatable manner to a first gearbox element of said first mechanical gearbox portion.

4. The multi-speed gearbox according to claim 3, wherein said third gearbox element of said second mechanical gearbox portion is connected in a fixed-rotatable manner to a third gearbox element, of said first gearbox portion.

5. The multi-speed gearbox according to claim 4, wherein said third gearbox element of said third planetary gear set of said first mechanical gearbox set portion is a ring gear.

6. The multi-speed gearbox according to claim 4, wherein said third gearbox element of said second mechanical gearbox portion is formed by a ring gear.

7. The multi-speed gearbox according to claim 1, wherein said start element is an inch brake device.

8. The multi-speed gearbox according to claim 7, wherein said inch brake device has a laminar design.

9. The multi-speed gearbox according to claim 8, further comprising:
   an annular chamber surrounding outer laminations of said inch brake device, said annular chamber having the capability of being filled with an operating means; and
   control means for controlling the flow of said operating means to said annular chamber.

10. The multi-speed gearbox according to claim 7, wherein:
   said inch brake device is associated with an open circuit, said circuit being connected to a gearbox oil sump.

11. The multi-speed gearbox according to claim 1, wherein said realizing means includes at least one selected from the set including coupling devices and brake devices.

12. The multi-speed gearbox according to claim 11, wherein said at least one has a laminar design.

13. The multi-speed gearbox according to of claim 1, wherein:
   said first mechanical gearbox portion includes a first planetary gear set, a second planetary gear set and a third planetary gear set;
   said first, second and third planetary gear sets including at least one sun gear, a ring gear, a crosspiece, and planetary gear;
   a first gearbox element of said first planetary gear set is connected in a fixed-rotatable manner to said gearbox input shaft; and
   a second gearbox element of said third planetary gear set is connected in a fixed-rotatable manner to said gearbox output shaft.

14. The multi-speed gearbox according to claim 13, wherein said first gearbox element of said first planetary gear set of said first mechanical gearbox portion is a sun gear.

15. The multi-speed gearbox according to one of claim 13, wherein said second gearbox element of said third planetary gear set of said first mechanical gearbox portion is a crosspiece.

16. The multi-speed gearbox according to claim 1, wherein:
- said coupling means comprises a first coupling element, a second coupling element, a first brake device, a second brake device, and a third brake device;
- said first gearbox elements of said second planetary gear set and of said third planetary gear set can be coupled at least indirectly to said gearbox input shaft by said first coupling element;
- said second gearbox element of the second planetary gear set and a third gearbox element of said third planetary gear set can be coupled to said gearbox input shaft by said second coupling element; and
- said first, second, and third brake devices associated with a third gearbox element of said first, second, and third planetary gear sets of said first mechanical gearbox portion.

17. The multi-speed gearbox according to claim 16, wherein:
- said first gearbox elements of said second planetary gear set and of said third planetary gear set of said first mechanical gearbox portion are sun gears;
- said second gearbox element of said second planetary gear set of said first mechanical gearbox portion is a crosspiece; and
- said third gearbox elements of said planetary gear sets of said first mechanical gearbox portion are formed by ring gears.

18. A multi-speed gearbox comprising:
- a gearbox input shaft and a gearbox output shaft;
- a first mechanical gearbox part;
- means for coupling the first mechanical gearbox part to the gearbox input shaft;
- a start element including a second mechanical gearbox comprising at least one planet gear set, said start element further including a first gearbox element of the second mechanical gearbox part coupled to the first mechanical gearbox and to the gearbox output shaft, said start element being designed as a brake device and associated with another second gearbox element of the second mechanical gearbox, the starting element being capable of being selectively used for both a first gear and a reverse gear; and
- means for realizing the individual gear steps are associated with the first mechanical gearbox part which means for realizing can be actuated in such a manner that the transmissions in the first gear and in the reverse gear can be determined by the second mechanical gearbox part.

* * * * *